No. 623,996. Patented May 2, 1899.
A. W. DIEHL.
BICYCLE BRAKE.
(Application filed Sept. 27, 1897.)
(No Model.)
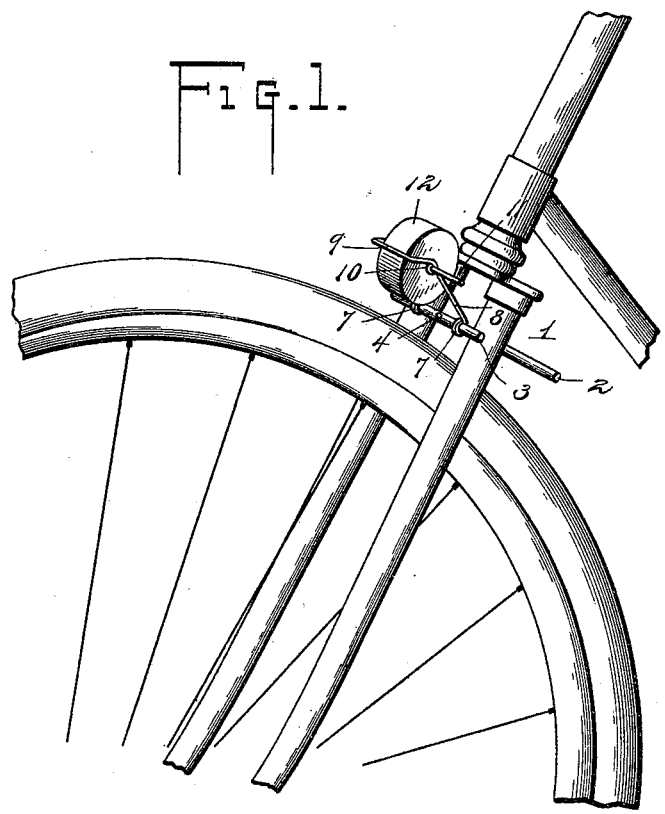
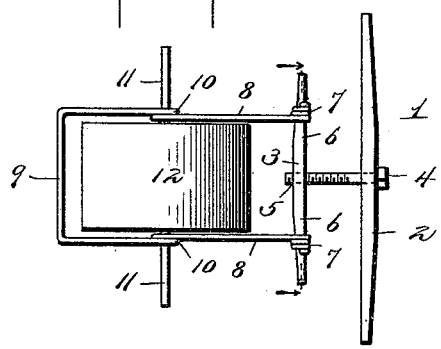
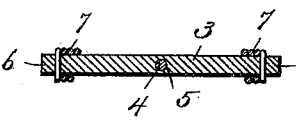
Witnesses
Harry L. Ames.
K. A. Nau.
Inventor
Anthony W. Diehl.
By V. D. Stockbridge,
His Attorney
THE NORRIS PETERS CO., PHOTO-LITHO., WASHINGTON, D. C.

UNITED STATES PATENT OFFICE.

ANTHONY WAYNE DIEHL, OF MILLHEIM, PENNSYLVANIA.

BICYCLE-BRAKE.

SPECIFICATION forming part of Letters Patent No. 623,996, dated May 2, 1899.

Application filed September 27, 1897. Serial No. 653,159. (No model.)

*To all whom it may concern:*

Be it known that I, ANTHONY WAYNE DIEHL, a citizen of the United States, residing at Millheim, in the county of Centre and State of Pennsylvania, have invented certain new and useful Improvements in Bicycle-Brakes; and I do hereby declare the following to be a full, clear, and exact description of the invention, such as will enable others skilled in the art to which it appertains to make and use the same.

My invention relates to novel and useful improvements in bicycle-brakes; and it has for its object, primarily, to provide a brake that can be readily attached to and detached from the forks of a bicycle of ordinary construction and one which when so attached will be in convenient position to be operated by the foot of the rider to depress the brake and bring the same in contact with the tire of the wheel.

A further object of the invention is to provide a device of this character that will be especially simple in construction, durable, economical, and efficient in operation.

With these and other objects in view, which will become apparent in the course of the following description, all looking toward improving and simplifying devices of this character generally, my invention consists in the novel combination and arrangement of simple parts that will be hereinafter fully described, and the points of novelty will be particularly set forth in the appended claim.

To these ends I have devised the brake illustrated in the accompanying drawings, in which—

Figure 1 is a perspective view of the upper portion of the front fork of a bicycle, showing my improved brake applied thereto. Fig. 2 is a top plan view of the clamp and brake removed from the front fork. Fig. 3 is a detail section through the forward bar of the clamp.

Referring to the drawings, the numeral 1 indicates a clamp formed of two parallel metallic bars 2 and 3 and a screw-threaded bolt 4, which passes through said bars 2 and 3 and serves to draw them in close contact with the front and rear edges of the prongs of the front fork of the bicycle when the brake is in position for use.

In practice the bar 2 is made considerably longer than the bar 3 and permitted to extend on either side of the fork a sufficient distance to form coasters. The bar 3 is preferably reduced in thickness on either side of its center, as indicated by the numeral 6, around which, in carrying out my invention, I form two oppositely-disposed coils, the ends of which are held in openings in said bar, the wire forming said coils being bent to form two substantially parallel spring-arms 8 and a transverse bar 9, connecting said side arms at their forward ends, the arms 8 being formed with eyes 10 for the reception of the ends of an axle 11, upon which is mounted a friction-roller 12, which is preferably formed of rubber or other yielding material, so that no injury will result to the tire by the complete application of the brake. The ends of the axle 11 are extended to form foot-rests for enabling the rider to apply the brake.

The spring-arms 8, with the aid of the coils 7, keep the friction-roller normally out of engagement with the tire of the wheel. The connecting portion braces the arms 8 and forms an auxiliary rest adapted to be engaged by the foot to force the roller in contact with the tire when it is desired to apply the brake.

It is obvious that the brake can be readily removed by unscrewing the bolt 4 and that by reason of the construction shown the brake can be adjusted vertically.

Having thus described my invention, what I claim as new, and desire to secure by Letters Patent, is—

A bicycle-brake comprising a clamp formed of two bars connected by a bolt and adapted to be secured to the front fork of a bicycle, the rear bar of said clamp being extended to form foot-rests, oppositely-disposed spring-arms formed with coils at their rear ends surrounding the front clamp-bar and connected thereto, a shaft mounted in said arms and extended laterally on each side thereof, and a friction-roller mounted on said shaft, the spring-arms being connected to the clamp in such manner that the roller will be normally out of contact with the tire, substantially as described.

In testimony whereof I have signed this specification in the presence of two subscribing witnesses.

ANTHONY WAYNE DIEHL.

Witnesses:
CHAS. C. DIEHL,
MAGGIE A. DIEHL.